United States Patent Office 2,960,612
Patented Nov. 15, 1960

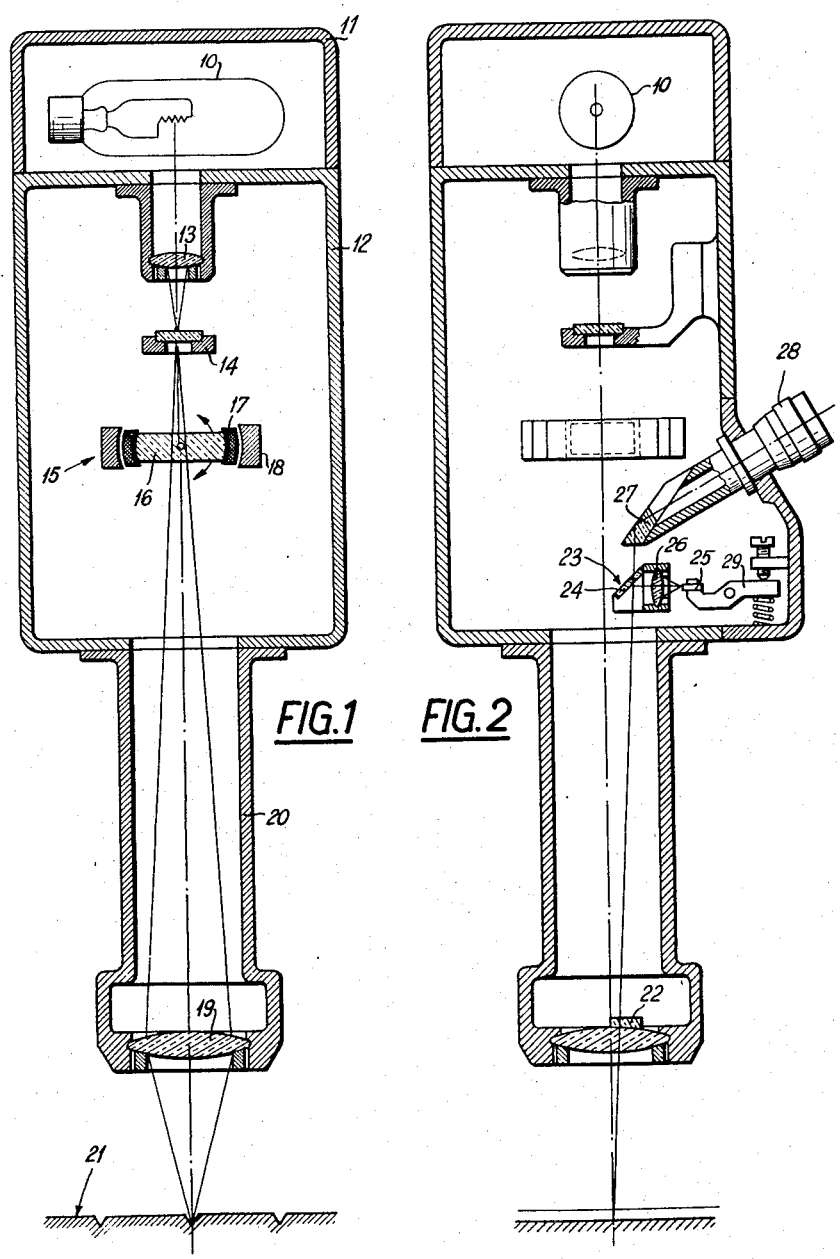

2,960,612

PHOTO-ELECTRIC MICROSCOPE

Miron Koulicovitch, Geneva, Switzerland, assignor to Societe Genevoise d'Instruments de Physique, Geneva, Switzerland, a firm of Switzerland Filed Nov. 7, 1957, Ser. No. 695,075

Claims priority, application Switzerland Nov. 7, 1956

5 Claims. (Cl. 250—230)

My invention has for its object a photo-electric microscope of the type serving for the photo-electric definition of the location of a line of the scale of a highly accurate rule, such as that described in the Swiss Patents Nos. 281,171 and 297,676.

Microscopes of this type are provided with a source of light forming an illuminating beam producing through an objective an image of said source of light on the scale-carrying surface, said source of light being associated with an optic deflector subjected to undamped oscillations imparting the luminous beam with an oscillating movement which makes it sweep the scale, while a photo-cell, sensitive to the contrast between the intensity of the rays reflected by the line the position of which is to be defined and that of the rays reflected by the surface adjacent said line is subjected to the action of said rays.

Such microscopes are furthermore and generally equipped with means for the optic observation of the area of the rule which is being swept. In such a case, the reflected beam is subdivided into two sections of which one is directed towards the photo-cell while the other is directed towards the observer's eye-piece.

The arrangements of this type used hitherto for this purpose include a sheet of semi-transparent glass extending across the luminous beam reflected by the surface of the rule and deflecting a section of said beam into an eye-piece. However, said solution shows the drawback of reducing by about 50% the luminosity of the rays directed on the one hand onto the photo-cell and on the other hand onto the eye-piece.

It would be of advantage with a view to obtaining a maximum sensitivity for the photo-cell to subdivide the light projected by the source of light according to its wave lengths with a view to directing towards the photo-cell those rays for which the latter has a maximum efficiency and onto the eye-piece those rays which are most suitable for reception by the human eye.

It is a well-known fact that, for instance, photo-cells of the germanium type are chiefly sensitive to infra-red rays outside the range of visibility, while the eye receives preferably green to blue or green to yellow rays which have only a reduced action on such photo-cells.

Now, the present invention has for its object to provide means for selecting rays in the reflected beam in accordance with such criteria.

My improved microscope as described hereinafter separates the rays adapted to form the two beam fractions through an optic selector directing towards the photo-cell the rays for which the latter has an optimum sensitivity and towards the eye-piece provided for optic observation those rays which are the most suitable for the human eye.

In the case where the photo-cell is a germanium cell, it is possible to use as a selector a sheet of glass coated on one side with a thin layer of copper reflecting at the rate of 100% the infra-red rays, while it allows the visible green or green and blue rays to pass.

If on the other hand, the photo-electric cell is of the photo-multiplying type which is sensitive to blue light, it is possible to select the blue rays by means of an interferential filter and to direct the green or yellow rays towards the eye-piece. The use of a photo-electric cell of the germanium type in association with infra-red rays provides various advantages since said cells are small, show a high sensitivity and are not expensive. Furthermore, infra-red rays are obtained readily starting from a source of light constituted by an incandescent lamp operating under slightly reduced voltage and the coefficient of reflection of the infra-red rays on the surface of the scale-carrying rule is substantially higher than that of rays having a shorter wave-length so that the heating of the rule under the action of the incoming light will be smaller for an equal amount of radiated energy.

The accompanying drawings illustrate by way of example an embodiment of my improved photo-electric microscope.

Figs. 1 and 2 of said drawings are two axial cross-sections of said embodiment, through two planes perpendicular to each other.

The microscope illustrated includes an incandescent bulb 10 fed by a current under slightly reduced voltage. Said bulb is fitted inside a compartment 11 forming the upper section of an elongated case 12 inside which are enclosed a lens 13, a diaphragm 14 and a deflector 15.

The deflector 15 is constituted by a thick sheet of glass 16 with flat parallel surfaces round which is fitted a winding 17 fed by the mains. Said glass sheet oscillates at the frequency of the current from the mains inside the magnetic field produced by a permanent magnet 18, said field being symmetrical with reference to the optic axis O—O of the microscope.

An objective 19 is fitted in the opening of a sleeve 20 forming a lower extension of the case 12 and said objective forms on the surface of the rule 21 an image of the slot of the diaphragm 14, which slot is parallel to the lines of the scale on the rule. When the glass sheet 16 oscillates, said image sweeps an area of a small length with reference to the distance separating two successive lines of the scale. The beam reflected by the rule surface thus swept is partly deflected by a prism 22 (Fig. 2) glued to the lens forming the objective 19, so that the deflected fraction of the beam impinges on the optic selector 23. Said optic selector subdivides the reflected beam into two fractions of which one is constituted by the infra-red rays and the other by the rays of a shorter wave-length. The selector is constituted by a glass sheet 24 coated on its front surface with a thin layer of copper reflecting all the infra-red rays, while it is transparent for the rays of a shorter wave-length.

The infra-red rays thus reflected by the copper layer are brought to a focus on the sensitive surface of the photo-cell 25 of the germanium type by a lens 26, while the visible rays are reflected by a glass sheet or prism 27, along the optic axis of the observer's eye-piece 28.

The photo-cell 25 is fitted on an adjustable support 29 which allows an accurate adjustment of its position.

What I claim is:

1. In a photo-electric microscope for the examination of the location of a scale-carrying surface, including a source of light, an objective adapted to form an image of the source on the scale-carrying surface, an optic deflector extending across the path of the beam of light and means for imparting undamped oscillations to said deflector round an axis perpendicular to the general direction of the beam of light, the provision of light-splitting examination means comprising means for deflecting a fraction of the light reflected by the scale-carrying surface, an optic selector subjected to the impact of the deflected light and adapted to separate the last-mentioned fraction into two subfractions of clearly different wavelength ranges forming respectively light including rays of at least one of the following colors: yellow and green, and light clearly outside the range of the first mentioned subfraction, an eye piece subjected to the impact of the first mentioned subfraction and a photocell sensitive to the light of the second subfraction and subjected to the impact of said light of the second subfraction.

2. In a photo-electric microscope for the examination of the location of a scale-carrying surface, including a source of light, an objective adapted to form an image of the source on the scale-carrying surface, an optic deflector extending across the path of the beam of light and means for imparting undamped oscillations to said deflector round an axis perpendicular to the general direction of the beam of light, the provision of light-splitting examination means comprising means for deflecting a fraction of the light reflected by the scale-carrying surface, an optic selector subjected to the impact of the deflected light and adapted to separate the last-mentioned fraction into infra-red rays and rays of a shorter visible wave-length, a germanium photo-cell subjected to the impact of the infra-red rays produced by the selector and an eye-piece subjected to the impact of the visible rays.

3. In a photo-electric microscope for the examination of the location of a scale-carrying surface, including a source of light, an objective adapted to form an image of the source on the scale-carrying surface, an optic deflector extending across the path of the beam of light and means for imparting undamped oscillations to said deflector round an axis perpendicular to the general direction of the beam of light, the provision of light-splitting examination means comprising means for deflecting a fraction of the light reflected by the scale-carrying surface, an optic selector subjected to the impact of the deflected rays and including a sheet of glass and a thin layer of copper coating one of the sides of said sheet of glass, said selector reflecting all the infra-red rays of the last mentioned fraction of the deflected rays and being transparent to rays of a shorter wave-length, a germanium photo-cell subjected to the impact of the infra-red rays produced by the selector and an eye-piece subjected to the impact of the visible rays of a shorter wave-length passing out of the selector.

4. In a photo-electric microscope for the examination of the location of a scale-carrying surface, including a source of light, an objective adapted to form an image of the source on the scale-carrying surface, an optic deflector extending across the path of the beam of light and means for imparting undamped oscillations to said deflector round an axis perpendicular to the general direction of the beam of light, the provision of light-splitting examination means comprising means for deflecting a fraction of the light reflected by the scale-carrying surface, an optic selector subjected to the impact of the deflected rays and adapted to separate the last-mentioned fraction into two sub-fractions of different wave-lengths, respectively forming blue light and light including rays of at least one of the following colors: yellow and green, a photo-cell sensitive to blue light and subjected to the impact of the blue light subfraction from the selector and an eye-piece subjected to the impact of the second sub-fraction.

5. In a photo-electric microscope for the examination of the location of a scale-carrying surface, including a source of light, an objective adapted to form an image of the source on the scale-carrying surface, an optic deflector extending across the path of the beam of light and means for imparting undamped oscillations to said deflector round an axis perpendicular to the general direction of the beam of light, the provision of light-splitting examination means comprising means for deflecting a fraction of the light reflected by the scale-carrying surface, an optic selector subjected to the impact of the deflected rays and adapted to separate the last-mentioned fraction into two sub-fractions of different wave-lengths, respectively forming blue light and light including rays of at least one of the following colors: yellow and green, an interferential filter associated with said optic selector, a photo-cell sensitive to blue light and subjected to the impact of the blue light subfraction from the selector and an eye-piece subjected to the impact of the second sub-fraction.

References Cited in the file of this patent

UNITED STATES PATENTS

| | | |
|---|---|---|
| 2,375,665 | Koulicovitch | May 8, 1945 |
| 2,742,837 | Streiffert | Apr. 24, 1956 |
| 2,882,420 | Koulicovitch | Apr. 14, 1959 |

FOREIGN PATENTS

| | | |
|---|---|---|
| 281,171 | Switzerland | June 3, 1952 |
| 684,435 | Great Britain | Dec. 17, 1952 |
| 916,229 | Germany | Aug. 5, 1954 |